Sept. 10, 1968      C. A. OWENS      3,400,707
LEVELING DEVICE FOR STOVE OR OVEN STRUCTURE
Filed April 21, 1967
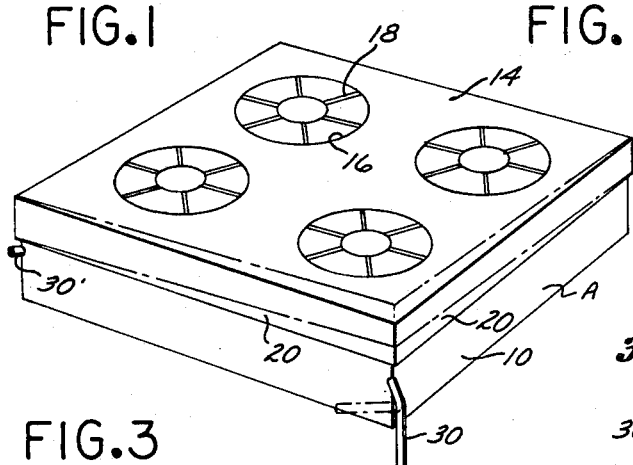
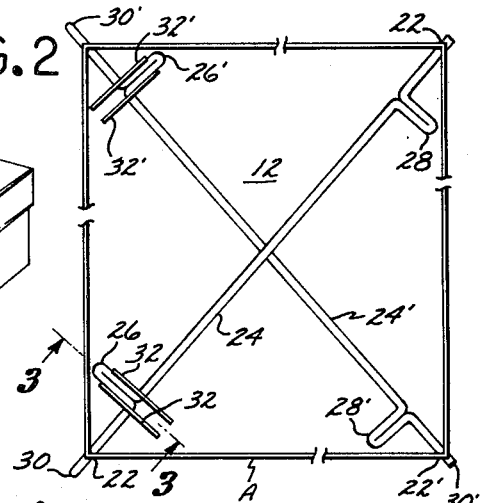
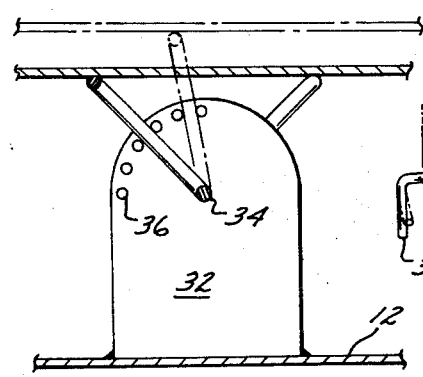
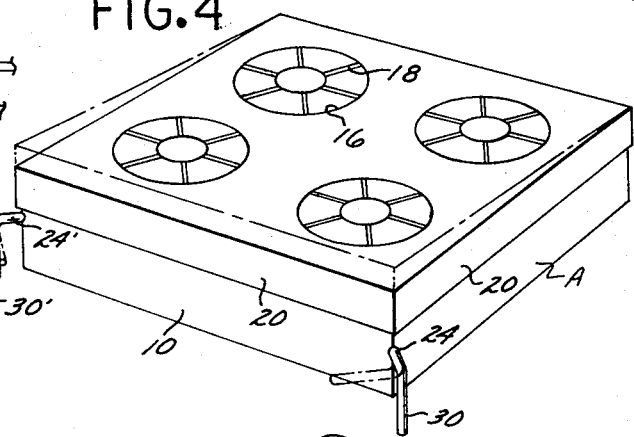
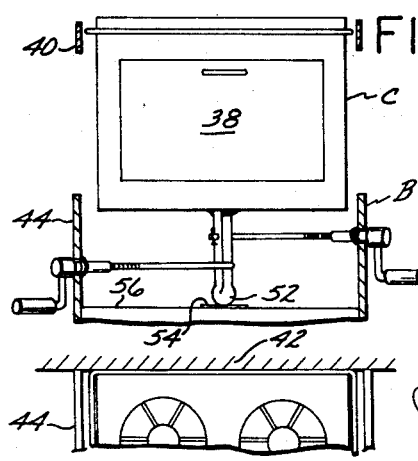
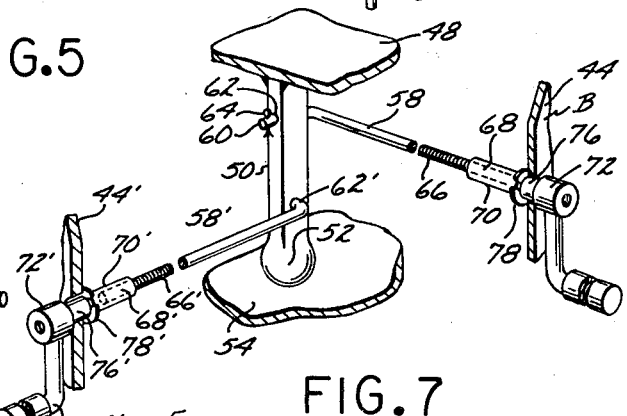
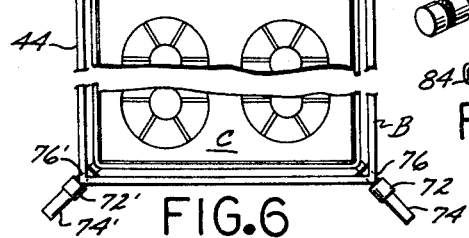
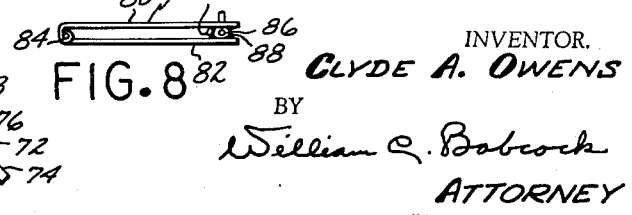
INVENTOR.
CLYDE A. OWENS
BY
William C. Babcock
ATTORNEY

United States Patent Office 3,400,707
Patented Sept. 10, 1968

3,400,707
LEVELING DEVICE FOR STOVE OR OVEN STRUCTURE
Clyde A. Owens, P.O. Box 52,
Wheeler Ridge, Calif. 93284
Filed Apr. 21, 1967, Ser. No. 632,685
3 Claims. (Cl. 126—211)

ABSTRACT OF THE DISCLOSURE

A device for adjusting the position of a stove or oven in a camper or other movable vehicle to a position where the stove or oven will support a pot, pan or other cooking utensil in a level position.

BACKGROUND OF THE INVENTION

*Field of the invention*

A device for so adjusting a camper-supported stove or oven to a position where a pot, pan, or other cooking utensil placed thereon will be level.

*Description of the prior art*

During the past few years, the popularity of trailers and campers has increased tremendously in providing either temporary or permanent living quarters in predetermined locations. Such vehicles normally include a stove or oven as a part thereof.

When a vehicle such as a camper is used to provide temporary living quarters in difficult locations or on uneven terrain, a stove or oven in the camper will be angularly disposed whereby it is incapable of supporting cooking utensils in a level position. This angular positioning of a stove or oven is most inconvenient, the contents of a cooking utensil will not spread evenly over the bottom thereof, but tend to run to the low point therein.

The present invention permits a stove or oven to be easily adjusted to a position relative to the trailer with which it is associated to one where cooking utensils are supported in a level position on the stove or in the oven, whereby the difficulties of cooking previously encountered are substantially eliminated.

SUMMARY OF THE INVENTION

A manually actuatable device that may be used to so position a spider-supporting sheet over one or more burners located beneath said spiders that cooking utensils supported on the spiders level to permit the contents of such utensils to cover the interior bottom sufaces thereof, and achieve even heating and proper cooking of food. A second manually operable device for so adjusting an oven relative to a camper in which it is installed to a desired position where cooking utensils disposed therein are supported in a substantially level position.

A major object of the invention is to provide manually adjustable means to permit either a spider-supporting sheet above one or more burners to be disposed in a horizontal position, or an oven adjusted to a position where shelves or other cooking utensil supporting means therein are positioned in a substantially horizontal plane.

Another object of the invention is to provide devices for adjusting the position of spider-supporting sheets or ovens which are of relatively simple mechanical structure, may be installed on either new or old oven structures, can be fabricated from standard commercially available materials, is simple and easy to use, requires little or no maintenance attention, and can be manufactured at a sufficiently low cost as to encourage the widespread use thereof in conjunction with stoves or ovens that are to be installed in campers or trailers.

BRIEF DESCRIPTION OF THE DRAWING

FIGURE 1 is a perspective view of an adjustable spider-supporting sheet mounted on the upper portion of a conventional stove structure;

FIGURE 2 is a top plan view of the adjustable actuating device used with the sheet shown in FIGURE 1;

FIGURE 3 is a fragmentary, combined, vertical cross-sectional and elevational view of the device shown in FIGURE 2, taken on the line 3—3 thereof;

FIGURE 4 is a perspective view of the device shown in FIGURE 1, but with the spider-supporting sheet having been tilted to a position where the spiders are in a substantially horizontal plane;

FIGURE 5 is a combined front elevational and vertical cross-sectional view of an oven and manual adjusting means for disposing the same in a position where cooking utensils are held in a level position when disposed on supporting portions thereof;

FIGURE 6 is a top plan view of the device shown in FIGURE 5;

FIGURE 7 is an enlarged perspective view of the manually operable device shown in FIGURE 5 for adjusting the oven to a desired level; and FIGURE 8 is a side elevational view of a third form of the device.

DESCRIPTION OF THE PREFERRED EMBODIMENTS

With reference to the first form A of the invention, it will be seen in FIGURE 1 of the drawing that it is associated with a conventional rectangular frame 10 which supports a number of spaced burners (not shown). The burners are disposed in fixed positions above a horizontal base 12, as best seen in FIGURE 3, which base is connected to the lower edge portions of the frame 10. A sheet 14 is provided that extends across the upper portion of the frame 10 and is supported on the upper edges thereof. A number of spaced openings 16 are formed in sheet 14, with each of the openings being in vertical alignment with one of the burners (not shown).

A spider 18 extends across each opening 16, and each spider serves to removably support a cooking utensil (not shown), to permit heating thereof by the burner (not shown) associated with that particular spider. The sheet 14 has side walls 20 extending downwardly from the outer extremities thereof, and these side walls are so spaced as to loosely and slidably engage the exterior surfaces of the frame 10.

Diagonally aligned openings 22 are formed in frame 10, as shown in FIGURES 1 and 2, which rotatably support the end portions of a first rod 24. Two longitudinally spaced legs 26 and 28 extend outwardly in opposite directions from rod 24, as shown in FIGURE 2. Legs 26 and 28 are conveniently formed by doubling over portions of the rod 24. A handle 30 is formed on one end of rod 24, which handle may be easily grasped to permit pivoting of the rod. The legs 26 and 28 are of such length that as the rod 24 is rotated, one of the legs will engage the under side of the sheet 14 and tilt it. The legs 26 and 28 are disposed at an angle of substantially 90° relative to one another as shown in FIGURE 3.

A second rod 24' is provided that is of the same configuration as that of the first rod 24, and is rotatably supported in openings 22' formed in frame 10 in a direction normal to the first rod. Elements of second rod 24' common to those of first rod 24 are designated in the drawing by the same identifying numerals used in conjunction with the first rod, but to which a prime has been added.

When it is desired to tilt but a corner portion of the sheet 14 to place the sheet in a horizontal plane, as shown in phantom line in FIGURE 1, this is accomplished by rotation of but one of the rods 24 or 24'. If either the forward or rear portion of the sheet 14 is to be tilted (FIGURE 4), this is accomplished by rotation of the rods 24 and 24' in appropriate directions. After the sheet 14 has been tilted relative to the frame 10 to bring it into a true horizontal plane by rotation of the rods 24 and 24', the rods must be removably held in a non-rotating position to maintain the sheet level.

For this purpose it has been found convenient to provide two slightly resilient upright members 32, best seen in FIGURES 2 and 3, that are welded or otherwise rigidly secured to the upper surface of the base 12. Members 32 (FIGURE 2) are parallel to the leg 26. Bores 34 formed in the upright members 32 rotatably support straight portions of the rod 24. The adjacent faces of the members 32 are formed with a number of circumferentially spaced raised bodies 36 that extend towards one another.

The bodies 36 are so spaced that pairs thereof resiliently grip opposite sides of the leg 26, as shown in FIGURE 3, and hold the leg in a desired position where the sheet 14 is disposed in a horizontal plane. Various positions that the legs 26 and 28 may occupy relative to the sheet 14 are shown in phantom line in FIGURE 3.

The bodies 36 resiliently engage the leg 26 with sufficient force to prevent inadvertent rotation of the rod 24, but not to such an extent as to prevent rotation of this rod by use of the handle 30. The second rod 24' is also provided with two resilient upright members 32', as illustrated in FIGURE 2. Members 32' are of the same construction as that of members 32, and serve to hold the second rod 24' in a desired non-rotating position relative to frame 10. The opening 16, as well as the locationing of the burners (not shown) are so arranged relative to one another as to not interfere with the position of the rods 24 and 24' in the frame 10. The second rod 24' is rotatably supported in the frame 10, either above or below the first rod 24.

A second form B of the invention is shown in FIGURES 5–7 inclusive, that is particularly adapted for adjusting a conventional oven C to a position where shelves (not shown) within the confines thereof may be disposed in a horizontal position, irrespective of the angulation of the camper or trailer in which the oven C is installed. The oven C is of conventional rectangular shape, with a door 38 pivotally mounted on the forward portion thereof. A U-shaped band 40 extends outwardly from a side wall 42 of a camper (not shown) in which the oven C is installed, with the band loosely engaging the upper portion of the oven C, and disposed above the upper exterior of the door 38. Should the oven C be disposed between two adjacent built-in structures of the camper (not shown), the band 40 may be dispensed with, and the built-in structures utilized to maintain the oven C in an upright position.

A second U-shaped shell 44 is provided that is preferably in vertical alignment with the first U-shaped band 40, and extends around the lower extremity of the oven C, as shown in FIGURE 5. Shell 44 can be supported from the floor 46 of the camper, as also shown in FIGURE 5. At least the forward portion of shell 44 cannot extend above the lower extremity of the door 38, for otherwise it would prevent the full opening thereof.

Should it be desired, the band 40 and shell 44 can be connected, provided an opening is formed therein when so connected as to permit access to the interior of the oven C through the door 38.

A rigid support member 50 extends downwardly from the bottom 48 of oven C, as may be seen in FIGURE 7, and this member terminates in a bulb-like lower end 52. Should it be desired, a conventional caster (not shown) may be affixed to the lower end of the support member 50. The lower end 52 slidably engages either the floor 56 of the camper or a rear plate 54 supported on the floor as illustrated in FIGURE 5.

A first L-shaped rod 58 is provided that includes a leg 60 which extends through a transverse bore 62 formed in the member 50 to pivotally connect this first rod to the member. Inadvertent disengagement of leg 60 from member 50 is prevented by a cotter pin 64, or other holding means, mounted on the forwardly extending portion of the leg, as shown in FIGURE 7. The rod 58 has a threaded end portion 66 which is adapted to engage an elongate tapped cavity 68 formed in a cylindrical member 70. The outer end of member 70 supports an enlarged head 72, and an L-shaped handle 74 is secured to this head. Member 70 is loosely but rotatably supported in an opening 76 formed in one of the forward corner portions of shell 44, as may best be seen in FIGURE 6.

A washer 78 is rigidly secured to the elongate member 70 inwardly from the head 72 to prevent inadvertent displacement of this member from the shell 44. When handle 74 is rotated, the member 70 will obviously rotate relative to the threaded portion 66 of rod 58, and move the rod inwardly or outwardy relative to the member, depending upon the direction of rotation of the handle. As this relative movement of rod 58 takes place relative to member 70, the oven C is tilted in a vertical plane that extends through the longitudinal axis of this rod.

A second rod 58' is provided that is identical to rod 58, and is pivotally connected to the member 50 in a direction normal to the first rod 58. The second rod 58' is associated with an identical group of elements as described in connection with the first rod 58, and this assembly is identified in FIGURE 7 of the drawing by the same numerals used in connection with the first rod assembly, but to which primes have been added. When the handle 74' is rotated, the member 70' in turn rotates relative to the threaded end portion 66' of second rod 58' and pivots the oven C in a direction normal to the direction of movement when the handle 74 is rotated. By separate rotation of handles 74 or 74', or concurrent rotation thereof, the oven C may be so adjusted that the shelves therein, as well as the upper portion of the oven, are all in a horizontal plane. The opening 76' is located in a forward corner position of the shell 44, as may be seen in FIGURE 6. Irrespective of whether a caster, roller, or enlarged end portion 52 is used on the lower end of the member 50, the operation of the device (FIGURES 5–7) is the same.

A third form E of a device for supporting a cooking utensil in a level position on top of a stove (not shown) is illustrated in FIGURE 8. Form E includes a first plate 80 that rests on the stove, and a second plate 82 is connected thereto by a hinge 84. Both plates 80 and 82 are formed from a heat-conducting material. An ovular cam 86 is rotatably supported from first plate 80 by conventional means, and is positioned between the first and second plates.

Serrations 88 are formed on the exterior surface of cam 86 that engage serrations 90 formed on the plates 80 and 82. Due to such engagement of the serrations, the cam 86 may be held in a desired adjusted position relative to the plates 80 and 82 to maintain the plate 82 in a horizontal position.

I claim:

1. In a camper or trailer-supported stove or oven structure including at least one burner disposed in a fixed position within a generally horizontal rectangular frame, the improvement for so holding a cooking utensil in a position above said burner that the bottom of said utensil is in a horizontal plane, comprising:

(a) a rigid sheet that at least partially rests on the upper edges of said frame;
(b) a plurality of side walls which depend from the outer extremities of said sheet and loosely engage the exterior surfaces of said frame;
(c) at least one spider affixed to said sheet and extending across on opening formed therein, which spider and opening are in vertical alignment with said burner;
(d) first and second horizontal rods rotatably supported in said frame and extending thereacross, which rods are disposed in a direction normal to one another;
(e) handle means for independently rotating each of said rods;
(f) two pairs of longitudinally spaced, transversely positioned legs that extend outwardly from said rods below said sheet, with each of said legs being of sufficient length as to contact and tilt said sheet relative to said frame when said rod on which said leg is mounted is pivoted in an appropriate direction by said handle means; and
(g) means for adjustably maintaining said first and second rods and legs in positions where said sheet is horizontal after said sheet has been so moved thereto by contact with said legs.

2. An improvement as defined in claim 1 wherein said first and seconds rods extend diagonally across said frame, and said legs are defined by doubled-over portions of said rods.

3. An improvement as defined in claim 1 which further includes:
(h) resilient means which pressure contact at least one of said legs in each of said pairs to maintain said rods in desired adjusted positions relative to said sheet.

References Cited
UNITED STATES PATENTS

| | | | |
|---|---|---|---|
| 456,357 | 7/1891 | Dee | 126—24 |
| 1,805,923 | 5/1931 | Robinson | 126—215 |

FREDERICK L. MATTESON, JR., *Primary Examiner.*

E. G. FAVORS, *Assistant Examiner.*